United States Patent [19]

Pollak et al.

[11] Patent Number: 5,058,280
[45] Date of Patent: Oct. 22, 1991

[54] SCROLL SAW BLADE HOLDER

[75] Inventors: Henry Pollak, Pottstown; Gordon V. Wells, Spring City, both of Pa.

[73] Assignee: American Machine & Tool Company, Inc., Royersford, Pa.

[21] Appl. No.: 566,599

[22] Filed: Aug. 13, 1990

[51] Int. Cl.⁵ .......................... B23D 49/04; B27B 3/10
[52] U.S. Cl. .......................................... 30/392; 83/783
[58] Field of Search .................. 30/392, 393; 83/698, 83/699, 781, 783, 786

[56] References Cited

U.S. PATENT DOCUMENTS

| | | | |
|---|---|---|---|
| Re. 32,020 | 11/1985 | Abel | 83/783 |
| 4,670,986 | 6/1987 | Chen | 83/783 |
| 4,807,507 | 2/1989 | Rice et al. | 83/783 |
| 4,838,138 | 6/1989 | Rice et al. | 30/392 |
| 4,953,431 | 9/1990 | Chen | 83/783 |

Primary Examiner—Douglas D. Watts
Assistant Examiner—Paul M. Heyrana, Sr.
Attorney, Agent, or Firm—Panitch Schwarze Jacobs & Nadel

[57] ABSTRACT

An improved scroll saw blade holder includes a one-piece body having a base and a pair of arms which extend transversely from the base and define an open area therebetween. A slot is provided in the base extending entirely through the base into the open area and extending only partially through the base in a direction generally perpendicular to a plane of the body so that the body remains integral in the base at the slot. A clip is provided on the body and includes a positioning plate which is received in the slot. The positioning plate is located adjoining a set screw in a threaded bore extending from the slot to one side of the body. A portion of a scroll saw blade is received and clamped in the slot between the positioning plate and a side of the slot opposite the threaded bore with the set screw. Scroll saw blades with or without mounting pins may be accommodated.

13 Claims, 3 Drawing Sheets

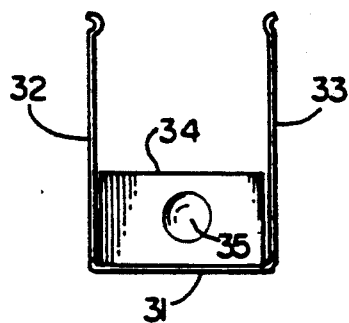
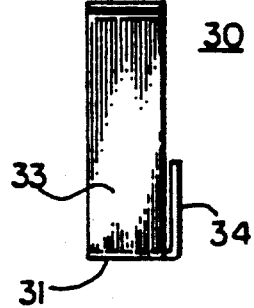
FIG. 7   FIG. 8
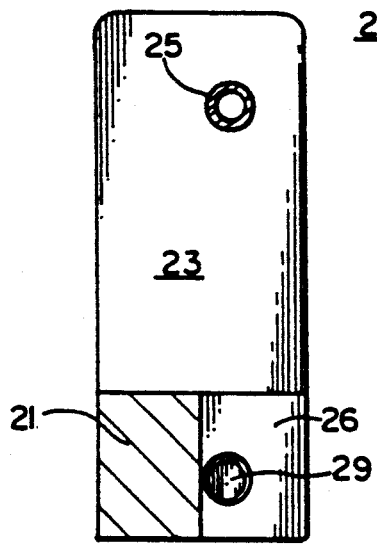
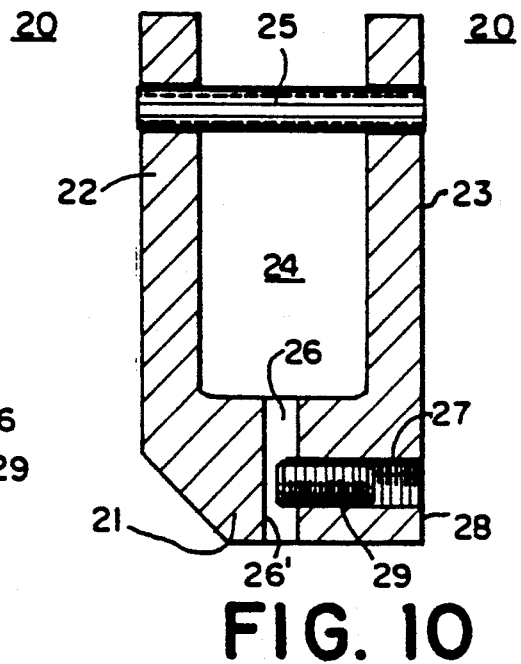
FIG. 9   FIG. 10

SCROLL SAW BLADE HOLDER

FIELD OF THE INVENTION

The present invention relates to blade holders and, in particular, to blade holders for scroll saws.

BACKGROUND OF THE INVENTION

Conventional scroll saw blade holders can be readily understood with reference to FIGS. 1A and 1B. In FIG. 1A, the flat end portion of a conventional scroll saw blade is clamped between two jaw portions of a first type of conventional blade holder. A screw passed through one of the jaw portions is used to press the flat end portion of the blade against the other one of the saw portions. One can easily see that the blade is not well clamped because of the limited contact surface area between the positioning screw and the blade end. The end portion of the blade is easily deformed or even damaged due to the relatively great pressure which must be applied through the positioning screw to even attempt to immovably hold the saw blade.

A second type of conventional scroll saw blade holder is shown in FIG. 1B. A pair of recesses are formed on the jaw portions of the second holder to receive a pin extending through a flat end portion of the saw blade.

Conventional saw blade holders are made of cast iron which is a relatively soft metal. Therefore, the blade holders tend to be damaged in use because of the tension and/or great pressure to which they are subjected by users attempting to firmly secure the saw blades. No matter how the saw blade is installed in conventional blade holders, the blade is not perfectly positioned. During operation of the saw, the blade may become loose in the holder and adversely affect the operation of the saw. Furthermore, the blade holder shown in FIG. 1B can only be used with a blade of a certain, predetermined length so that the pin thereof can be fitted perfectly in the recesses on the jaw portions of the blade holder.

It is a main object of the present invention to provide a scroll saw blade holder which solves the problems listed above which are experienced by conventional scroll saw blade holders.

SUMMARY OF THE INVENTION

In accordance with one aspect of the present invention, a scroll saw blade holder comprises a onepiece, generally U-shaped body having a base, a pair of arms extending from the base and a generally open area between the arms. A slot is provided extending completely through the base in a direction generally parallel to the arms. The slot extends only partially through the base in a direction perpendicular to a plane defined by the body whereby the body remains integral through the base. The blade holder further includes pin means extending between the arms across the open area of the body for mounting the body on a reciprocating arm of a scroll saw. The blade holder further comprises positioning means located in the slot for distributing a compressive force over substantially an entire portion of a scroll saw blade extending through the slot. The holder further comprises biasing means on the body for applying a compressive force against the positioning means to clamp the scroll saw blade end portion in the slot between the positioning means and the body.

In accordance with another aspect of the present invention, a scroll saw blade holder comprises a body including a base and a pair of arms extending substantially transversely from the base and forming an open area therebetween, a slot extending entirely through the base in a first direction into the open area between the arms, the slot extending only partially through the base in a direction perpendicular to the first direction and to a plane defined by the base and a threaded bore extending in a direction generally perpendicular to the slot from one side of the body to the slot. The holder further comprises a positioning member movably located in the slot adjoining the threaded bore. The holder further comprises a threaded member extending from the bore into contact with the positioning member to clamp with the positioning member a scroll saw blade positioned in the slot between the positioning member and a side of the slot opposite the threaded bore.

BRIEF DESCRIPTION OF THE DRAWINGS

The foregoing background and summary of the invention, as well as the following detailed description of preferred embodiments will be better understood when read in conjunction with the appended drawings. For the purpose of illustrating the invention, there is shown in the drawings an embodiment which is presently preferred. It should be understood, however, that the invention is not limited to the precise arrangement and instrumentalities shown. In the drawings:

FIGS. 7 and 8 are orthogonal elevations, respectively, of a positioning clip of the blade holder; and FIGS. 9 and 10 are sectioned front and side elevations, respectively, of the body of the blade holder.

DETAILED DESCRIPTION OF THE PREFERRED EMBODIMENT

Figure 3:
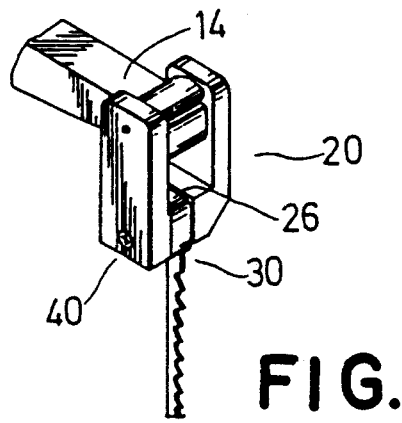
FIGS. 3 and 4 are enlarged, diagrammatic, isometric views of the upper and lower blade holders, respectively, of the scroll saw of FIG. 2.
Figure 2:
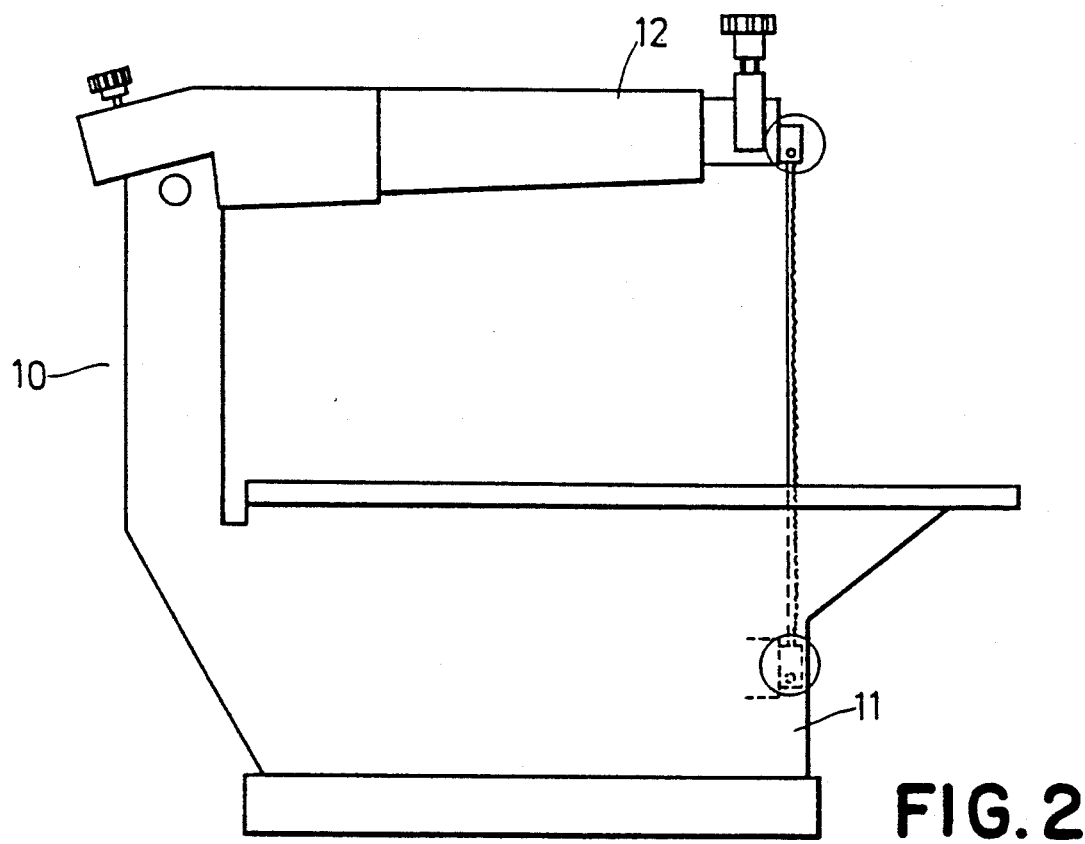
FIG. 2 is a diagrammatic side elevation of a scroll saw with blade holders according to the present invention.
Figure 4:
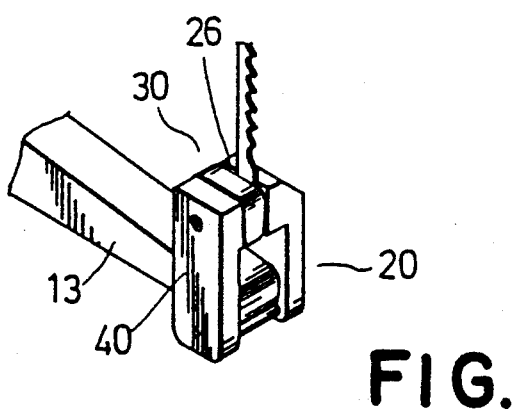

Referring to FIG. 2, a conventional scroll saw is indicated generally at 10 and comprises a base 11 having a support arm 12 formed thereon and extending therefrom. FIGS. 3 and 4 show details of two reciprocating arms 13 and 14 provided on the base 10 and support arm 12, respectively, which are encircled on FIG. 2. Each reciprocating arm 13 and 14 has a blade holder 18 of the present invention installed thereon.

Figure 5:
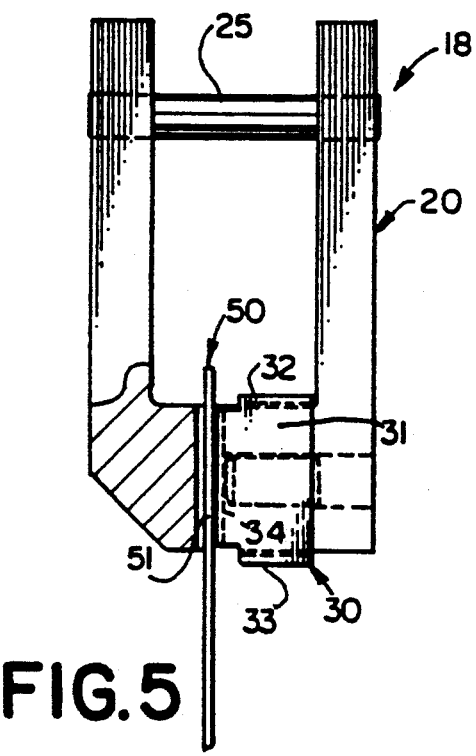
FIG. 5 is a partially sectioned view of a blade holder of the present invention showing its use with a first type of saw blade.
Figure 6:
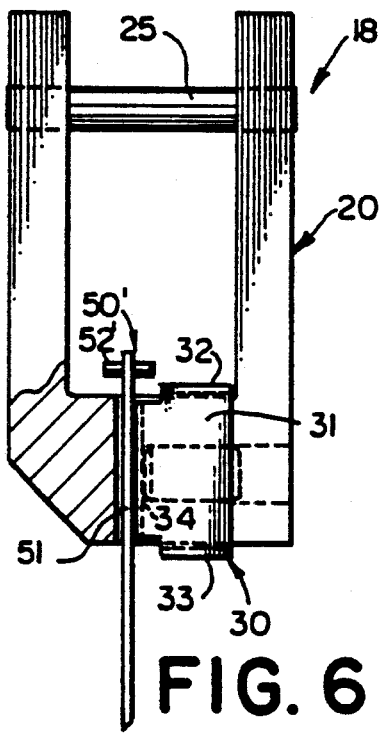
FIG. 6 is a partially sectioned view of a blade holder of the present invention showing its use with a second type of scroll saw blade having a pin provided through the end portion thereof.

Referring particularly to FIGS. 5 and 6, the blade holder 18 of the present invention comprises a body and a positioning plate clip, each indicated generally at 20 and 30, respectively. Referring to FIGS. 9 and 10, the body 20 is unitary, preferably one-piece and generally U-shaped and has a base 21 and a pair of arms 22 and 23 extending generally perpendicularly from the base and forming a generally open area therebetween, indicated generally at 24. Preferably, a pin 25 is provided extending between the arms 22 and 23 across the open area 24 in a plane defined generally by the body 20 to permit the body 20 to be mounted to either of the reciprocating arms 13 and 14 of the scroll saw 10. A slot 26 is provided extending completely through the base 21 in a first direction into the open area 24 between the arms and generally parallel to the arms 22 and 23 (vertical in FIGS. 9 and 10). The slot 26 extends only partially through the base in a second direction perpendicular to the first direction and to a plane defined by the body 20 (plane of FIG. 10). Body 20 thus remains integral through the base 21 as is indicated in FIG. 9. Preferably, the body 20 further includes a threaded bore 27 extending in a direction generally perpendicular to the slot 26 between the slot 26 and one side 28 of the body. Set screw 29 is provided in the bore 26 and is adjustable through the one side 28 of the body.

A preferred positioning clip 30 is depicted in FIGS. 7 and 8. Clip 30 also includes a generally U-shaped portion including a base 31 and a pair of generally parallel arms 32 and 33 extending perpendicularly from the base 31. Clip 30 further includes a positioning plate or member 34 extending from the base 31 between the arms 32 and 33. The components of the clip 30 are sized and its material selected so that the positioning plate or member 34 is insertable into the body slot 26 along with a saw blade end while the clip arms 32 and 33 extend over inner and outer sides of the body base 21 adjoining the slot 26 and removably retain the clip 30 on the body 20 as is best seen in FIGS. 5 and 6. The plate member 34 is preferably sufficiently large to substantially cover the side 26' of the slot opposite the threaded bore 27 and any end portion of a saw blade located between that side 26' and the member 34.

Use of the holder 18 will first be described with respect to a conventional scroll saw blade 50. Referring to FIG. 5, an end portion 51 of conventional scroll saw blade 50 is inserted into the slot 26 in a manner which locates the positioning member or plate 34 between the end portion 51 of the blade 50 and the bore 27 with set screw 29. The blade end portion 51 is thus located between the positioning plate 34 and a side 26' of the slot 26 opposite the bore 27 and set screw 29. After the height of the blade 50 is adjusted, the set screw 29 is threaded through the bore 27 against the positioning plate 34 applying a compressive force against the positioning plate 34 to bias the plate 34 towards side 26, of the slot 26 and clamp and secure the scroll saw blade portion 51 in the slot 26 between the positioning plate 34 and the body 20, in particular, side 26' of the slot 26. The positioning plate 34 may be provided with a recess 35, if desired, to receive the proximal or facing end of set screw 29.

FIG. 6 depicts the holder 18 of the present invention used with a scroll saw blade 50' including a pin 52' through an end thereof. The blade 50' is positioned in the slot 26 so that the pin 52' is spaced slightly from the body base 21 and slot 26 into the open area 24 between the arms 22 and 23. Mounting of each holder 18 to the reciprocating arms 13 and/or 14 of the scroll saw 10 is through the pin 25 and is entirely conventional.

Figure 1A:
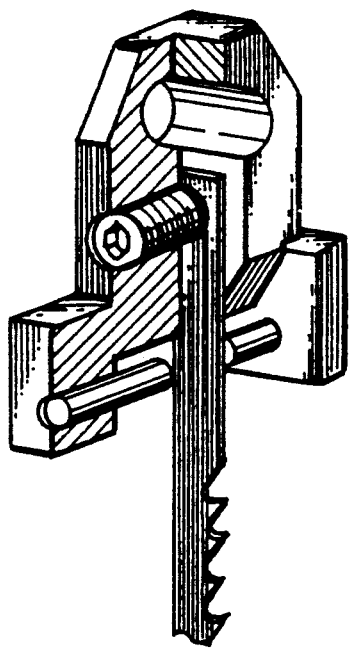
FIGS. 1A and 1B are partially sectioned perspective views of examples of two conventional scroll saw blade holders.
Figure 1B:
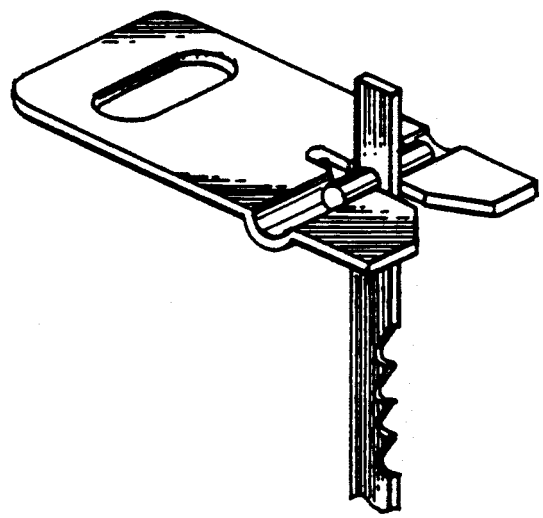

One can easily see that the holding or clamping effect of the blade holder 18 of the present invention is much better than the prior devices shown in FIGS. 1A and 1B because the area of contact between the positioning plate 34 and the end portion 51, 51' of the blade 50 is relatively large. A compressive clamping force applied to the end 51 through the positioning plate 34 and set screw 29, is spread over a larger area of the blade end 51, 51'. This permits an increase of the compressive force and the proportional frictional force upon the blade end 51, which actually clamps the blade end 51 in the device 18, while reducing the pressure that needs to be applied to the blade to achieve that force. It further prevents the likelihood of bending, distortion and/or breakage of the blade portion 51, 51' in the holder 18 by more uniformly spreading the compressive force on the blade end over a larger area of the blade end.

Although the blade holder of the present invention has been described by way of a preferred embodiment, it may be recognized by those skilled in the art that changes could be made without departing from the broad, inventive concepts thereof. It should be understood, therefore, that the invention is not limited to the particular embodiment disclosed, but is intended to cover any modifications which are within the scope and spirit of the invention, as defined by the appended claims.

We claim:

1. A scroll saw blade holder comprising:
   a one-piece, generally U-shaped body having a base, a pair of arms extending transversely from a base and an open end between the pair of arms, the body further including a slot extending completely through the base in a direction generally parallel to the arms, the slot extending only partially through the base in a direction perpendicular to a plane defined by the body whereby the body remains integral through the base;
   pin means across the open end of the body for mounting the holder on a reciprocating arm of the scroll saw;
   positioning means located in the slot for distributing a compressive force over substantially an entire end portion of the scroll saw blade located within the slot; and
   securing means on the body for applying a compressive force against the positioning means to clamp the scroll saw blade end portion in the slot between the positioning means and the body.

2. The scroll saw blade holder of claim 1 wherein a threaded bore is provided in the base with an axis thereof generally perpendicular to the slot, the bore extending from the slot to one side of the body, and wherein the securing means comprises a screw extending through the threaded bore into contact with the positioning means.

3. The scroll saw blade holder of claim 2 further comprising a recess on the positioning means receiving a facing end of the screw.

4. The scroll saw blade holder of claim 1 wherein the positioning means comprises a clip removably retained on the base of the body.

5. The scroll saw blade holder of claim 4 wherein a threaded bore is provided in the base with an axis thereof generally perpendicular to the slot, the bore extending from the slot to one side of the body, and wherein the securing means comprises a screw extending in the threaded bore into contact with the positioning means.

6. A scroll saw blade holder comprising:
   a unitary body having a base and a pair of arm extending generally transversely from the base and forming a generally open area therebetween, a slot extending completely through the base in a first direction into the open area between the arms, the slot extending only partially through the base in a direction perpendicular to the first direction and to a plane defined by the body, a threaded bore having an axis generally perpendicular to the slot extending from the slot to one side of the body;

a positioning member movably positioned within the slot; and a threaded member in the bore extending from the bore into contact with the positioning member and biasing the positioning means towards a side of the slot opposite the bore.

7. The scroll saw blade holder of claim 6 where in the positioning member is part of a clip removably retained on the base of the body.

8. The scroll saw blade holder of claim 7 further comprising a pin extending between the arms and across the open area, the pin being spaced along the arms from the base for permitting an end of a saw blade received in the slot to extend through the base and into the open area.

9. The scroll saw blade holder of claim 6 further comprising a pin extending between the arms and across the open area, the pin being spaced along the arms from the base for permitting an end of a saw blade received in the slot to extend through the base and into the open area.

10. The scroll saw blade holder of claim 1 wherein the plane defined by the body is defined by the two arms and the base of the body.

11. The scroll saw blade holder of claim 10 wherein the slots extends into the plane defined by the body from the outer surface of the body whereby the slot is exposed along the base.

12. The scroll saw blade holder of claim 6 wherein the plane defined by the body is defined by the two arms and the base of the body.

13. The scroll saw blade holder of claim 12 wherein the slot extends into the plane defined by the body from an outer surface of the body whereby the slot is exposed along the base.

* * * * *